United States Patent [19]
Bowen-Nielsen et al.

[11] Patent Number: 6,078,675
[45] Date of Patent: *Jun. 20, 2000

[54] COMMUNICATION SYSTEM FOR USERS OF HEARING AIDS

[75] Inventors: Jan Bowen-Nielsen, Vanlose; Ole Winberg, Hedehusene, both of Denmark

[73] Assignee: GN Netcom A/S, Copenhagen, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/639,832

[22] Filed: Apr. 29, 1996

[30] Foreign Application Priority Data

May 18, 1995 [DK] Denmark .................. 0571/95

[51] Int. Cl.⁷ .................................................. H04R 25/00
[52] U.S. Cl. .......................... 381/331; 381/370; 381/375
[58] Field of Search .......................... 381/68, 68.2, 68.4, 381/68.1, 68.5, 60, 68.6, 68.7, 69, 69.2, 312, 328, 315, 322, 323, 324, 331, 370, 375, 330; 379/52, 430, 433

[56] References Cited

U.S. PATENT DOCUMENTS

| | | | |
|---|---|---|---|
| 4,584,707 | 4/1986 | Goldberg et al. | 455/41 |
| 4,596,899 | 6/1986 | Wojcik et al. | 381/68.4 |
| 5,086,464 | 2/1992 | Groppe | 381/68 |
| 5,191,602 | 3/1993 | Regen et al. | 379/58 |
| 5,440,630 | 8/1995 | Yamaguchi et al. | 381/194 |
| 5,613,222 | 3/1997 | Guenther | 381/183 |

FOREIGN PATENT DOCUMENTS

| | | | |
|---|---|---|---|
| 0169792 | 1/1986 | European Pat. Off. | 381/68 |
| 42 11 147 | 4/1993 | Germany . | |
| 2160075 | 12/1985 | United Kingdom . | |
| 2277422 | 10/1994 | United Kingdom . | |
| WO 95/01678 | 1/1995 | WIPO . | |

*Primary Examiner*—Huyen Le
*Attorney, Agent, or Firm*—Merchant, Gould, Smith, Edell, Welter & Schmidt P.A.

[57] ABSTRACT

Communication system for users of hearing aids in connection with the use of a mobile telephone (1), and where the hearing aid user (5) wears at least one hearing aid (4). The system comprises a headset (3) coupled to the mobile telephone, said headset comprising a microphone (6) and a tele-coil (10) for communication with the hearing aid.

It is hereby avoided that electrical or electromagnetic noise from the mobile telephone penetrates the hearing aid.

2 Claims, 1 Drawing Sheet

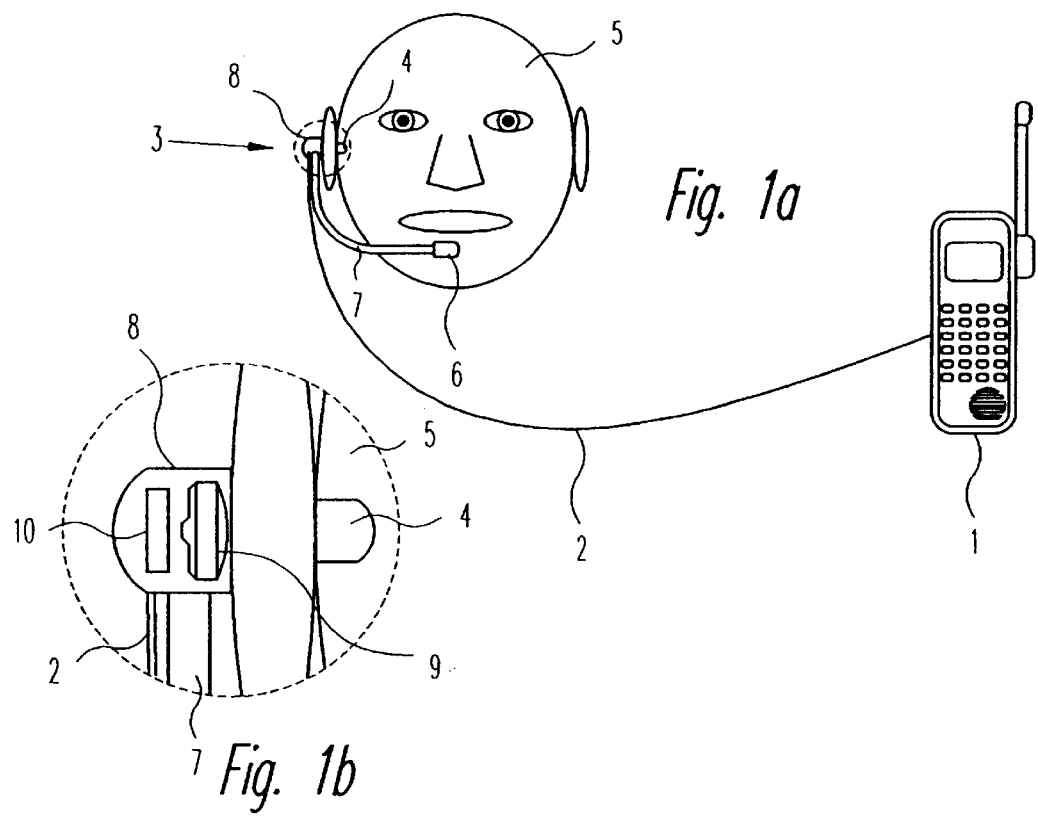
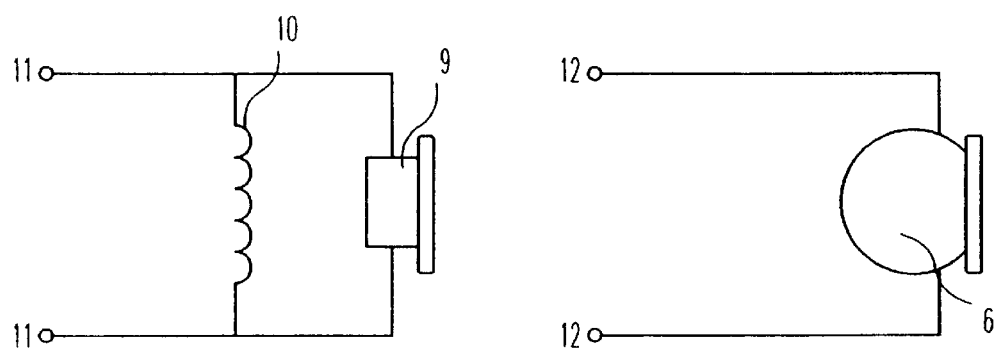

COMMUNICATION SYSTEM FOR USERS OF HEARING AIDS

BACKGROUND OF THE INVENTION

The invention relates to a communication system for the users of hearing aids, and as disclosed in the introduction to claim 1.

Such a system, but for use in receiving sound in connection with a radio receiver, TV receiver or the like, is known from British Patent Application No. 2,160,075, which describes an inductive coupling for the users of hearing aids. Via a commonly-known tele-coil, the inductive coupling transfers audio signals inductively to the user's hearing aid. There is hereby achieved an individual transfer of the audio signal to the user of the hearing aid via the hearing aid's so-called tele-coil signal input. This offers several advantages, e.g. that the volume of the sound for the hearing aid user can be regulated individually by means of the hearing aid, so that this does not influence the sound volume for possible other TV or radio listeners, and that the hearing aid user avoids background noise etc. and thus obtains a better sound quality.

A similar use of tele-coil communication for a hearing aid is known from International Application No. WO 95/01678, in that here there is used a tele-coil which is worn by the user, and from which audio signals from a unit coupled to the tele-coil can be transmitted further to the user's hearing aid via its tele-coil.

Moreover, it is known to use a headset in connection with a mobile telephone, hereby enabling hand-free operation and thus increase traffic security, and it is avoided that others in the vehicle can directly listen-in as is the case with other hand-free systems. Examples of such use are shown in U.S. Pat. No. 5,191,602 and British Patent Application No. 2,277, 422. However, ordinary hearing aid users have only limited benefit from such use, in that noise from the surroundings, for example traffic noise, engine noise and the like is still extremely disturbing and makes communication difficult, especially for persons with greatly impaired hearing.

Use of tele-coil communication from an ordinary hearing aid to a head-worn hearing aid with tele-coil signal input is commonly known, both where the tele-coil is mounted in the handset's receiver or in a special unit, cf. for example German Patent No. 4,211,147. This configuration cannot, however, be used with the hand-free operation of a mobile telephone.

ADVANTAGES OF THE INVENTION

By configuring the communication system for hearing aid users as disclosed and characterized in claim 1, further advantages and further possibilities of application are achieved, mainly in connection with the use of a mobile telephone or a similar communications device.

In practice it has shown that hearing aid users have problems with using mobile telephones and similar communication devices, in that such devices emit electrical or electro-magnetic signals which penetrate the hearing aid and prevent the user from using the aid because of noise signals. As an example can be mentioned GSM mobile telephones which operate following the so-called GSM protocol, where the high-frequency signal is emitted as pulses at a frequency of approx. 200 Hz, and the signals from such a mobile telephone can penetrate the hearing aid and generate a powerful audio signal which excludes normal use of the hearing aid. Consequently, a hearing-aid user cannot make normal use of a GSM mobile telephone or other communication equipment which transmits electrical or electromagnetic signals which can penetrate the hearing aid and generate noise signals.

By using the communication system as disclosed and characterized in claim 1, it has shown that in this manner the users of the hearing aids can still use an ordinary mobile telephone, e.g. a GSM mobile telephone or a similar communications device, in that in this way they can have the device placed at sufficient distance from the hearing aid so that electrical or electromagnetic signals cannot penetrate the hearing aid to such an extent that they disturb normal listening, and thus with the result that the whole communication functions as with ordinary hand-free operation but via the headset, while at the same time the user of the hearing aid also avoids background noise etc. from the vehicle and other traffic, and thus achieves optimum communication.

Practical tests have shown that even persons with greatly impaired hearing are given the possibility of carrying on normal telephone conversations when using the invention, which must be considered as being of great significance to those with defective hearing.

The users will normally be able to let their mobile telephone remain sitting in its usual holder in the vehicle.

When the mobile telephone is one which is carried in a pocket or in a special holder, e.g. a holder which can be fastened to a belt, the communication during the use of a communication system according to the invention can also be effected in a completely problem-free manner, when the mobile telephone is placed at sufficient distance from the hearing aid to prevent any significant degree of noise penetration.

The headset itself, which is used with the communication system according to the invention, can be configured as an ordinary standard headset in which there is placed a tele-coil as described in more detail in claims 2–9.

The invention also relates to a headset for use in connection with communication equipment or a communication system according to the invention and as disclosed and characterized in more detail in claim 10. Such a headset will be able to be supplied as an accessory for mobile telephones and similar communication devices, so that a hearing-aid user is given the same possibilities of using such devices as persons who do not have impaired hearing.

THE DRAWING

The invention will now be described in more detail with reference to the drawing, in that FIG. 1a shows a communication system according to the invention, FIG. 1b shows a part of the system in FIG. 1 on a larger scale, FIG. 2 shows the electrical diagram for the audio transducer with tele-coil, i.e. that part which is shown in FIG. 1b, and FIG. 3 shows the electrical diagram for the audio receiver shown in FIG. 1a.

DESCRIPTION OF THE EXAMPLE EMBODIMENT IN THE DRAWING

In the drawing is shown a mobile telephone 1, in the shown example a so-called GSM mobile telephone, which is held in the hand and arranged so that the transmitter, the receiver, battery, keypad, display, antenna etc. are built together to form an integral unit arranged to enable it to be carried in the hand and function as a mobile telephone, in that the housing in which the parts of the apparatus are built also houses audio transducers in the form of a microphone and a telephone receiver or the like.

The drawing also schematically shows a hearing-aid user 5 with a hearing aid 4 which is merely shown schematically, in that the invention can be used in connection with any kind of hearing aid, i.e. no matter whether the hearing aid is of the so-called behind-the-ear type, an all-in-the-ear hearing aid or a so-called CIC hearing aid (Complete In the Canal). The hearing-aid user 5 is equipped with a headset 3 which, as shown, comprises a housing 8 arranged to be positioned at the user's ear, i.e. the ear on which the hearing aid is worn. Extending from the housing 8 there is a microphone boom 7 with an audio transducer 6 in the form of a microphone, and a cable 2, e.g. a four-core cable for the mobile telephone 1.

In addition to the audio receiver 9, in the audio transducer housing 8 there is placed a tele-coil 10 which is arranged in such a manner that its axis is directed towards the hearing aid when the headset 3 is placed in its normal position of use.

When the user 5 of the hearing aid wishes to use the mobile telephone 1, he must merely place the headset 3 as shown. When the mobile telephone is hereafter placed at a suitable distance from the hearing aid, i.e. at a distance of approx. 0.5 m or more depending on the type of apparatus, there will not occur any transmission or only a modest amount of transmission of noise from the mobile telephone 1 to the hearing aid 4, and thus the user 5 can communicate in a quite normal manner via the mobile telephone using the headset's 3 microphone 6 and receiver 9. Should the hearing aid user 5 further wish to remove the background noise, he merely needs to couple the hearing aid 4 from the microphone position to the position in which the audio reception takes place via the hearing aid's tele-coil input.

The headset 3 can be any normal type of standard headset e.g. this patent applicant's headset of the type Profile® or the like.

In FIGS. 2 and 3 are seen examples of the electrical diagrams of the receiver in FIG. 2 and of the microphone in FIG. 3. In the example shown in FIG. 2, the receiver 9 is coupled in parallel with the tele-coil 10. In other constructions, the tele-coil can be coupled in series with the receiver. The tele-coil 10 can be an ordinary standard tele-coil, e.g. a tele-coil with a suitable number of windings of thin copper wire, so that the resulting coil is as shown in FIG. 1b with an outer diameter of approx. 15 mm and an inside diameter of approx. 4 mm and a coil height of approx. 2 mm. The tele-coil 10 has a resistance of approx. 150 ohms and an inductance of approx. 12 mH. A tele-coil of this kind can be placed in headsets of most types without requiring any significant changes.

The microphone 6 in FIG. 3 has, for example, a nominal impedance of 150 ohms, and is a normal electrodynamic loud-speaker. The cable 2 in FIG. 1a consists preferably of the four conductors 11 and 12 shown in FIGS. 2 and 3. The cable 2 is preferably provided with a standard plug at that end which is coupled to the mobile telephone 1, but naturally it can also be coupled to the mobile telephone in a permanent manner.

We claim:

1. Communication system for a hearing-aid user and for use in connection with a mobile telephone apparatus having a GSM protocol or a similar mobile telephone system, and where the hearing-aid user wears at least one hearing aid with tele-coil signal input, said system comprising:

a headset with a microphone coupled to the mobile telephone via a cable for placing the mobile telephone apparatus at a distance from the hearing aid, and the headset further comprising:

a housing, the hearing aid being disposed proximate to the housing;

a tele-coil, the tele-coil being disposed in the housing and coupled to the mobile telephone apparatus via the cable for communication with the hearing aid;

an audio receiver, the audio receiver being disposed in the housing and coupled to the tele-coil; and wherein the tele-coil is arranged in such a manner that an axis of the coil points in a direction towards the hearing aid.

2. Communication system according to claim 1, wherein the tele-coil is coupled electrically to the audio receiver in the headset.

* * * * *